[11] 3,577,097

[72] Inventor Ronald P. Hilberg
 Redondo Beach, Calif.
[21] Appl. No. 686,076
[22] Filed Nov. 28, 1967
[45] Patented May 4, 1971
[73] Assignee TRW Inc.
 Redondo Beach, Calif.

[54] LASER WITH COMBINED Q-SWITCH AND SYNCHRONIZED CAVITY DUMP CIRCUIT
 3 Claims, 14 Drawing Figs.
[52] U.S. Cl. ................................................. 331/94.5,
 350/157, 328/91, 350/150
[51] Int. Cl. ............................................. H01s 3/00
[50] Field of Search ........................................ 331/94.5;
 328/91, 101; 332/7.51

[56] References Cited
UNITED STATES PATENTS
3,277,393 10/1966 Nicolai ......................... 331/94.5
3,407,364 10/1968 Turner ......................... 332/7.51

*Primary Examiner*—Ronald L. Wibert
*Assistant Examiner*—Paul K. Godwin
*Attorneys*—Daniel T. Anderson, Alfons Valukonis and Edwin A. Oser ABSTRACT: A laser employing a single modulator in the form of a Pockels cell in the laser cavity and a polarizer. The polarizer in the cavity passes radiation having one polarization direction coming from one direction and diverts radiation having another polarization direction into an absorber. The polarizer passes radiation having one polarization direction coming from an opposite direction and diverts radiation having the other polarization direction into an output path. The modulator in the cavity rotates the polarization direction of radiation to establish the other polarization direction when energized and permits passage of radiation when it is deenergized. A high voltage electrical waveform generator circuit is provided which generates a voltage waveform having a positive DC voltage leading edge and a negative DC voltage trailing edge to the modulator. A gas trigger tube is provided in the circuit which generates a positive DC voltage leading edge in its plate circuit when it is independently triggered by a trigger signal. Another gas trigger tube generates a positive voltage when it is triggered by another trigger signal from a photodiode positioned to intercept radiation leaking from laser cavity. A coupling circuit which couples the plate circuits of the trigger tubes includes a capacitor which converts the positive voltage generated by the other trigger tube into the negative DC voltage trailing edge of the voltage waveform. The coupling circuit may also include a differentiator which allows the voltage levels on the trigger tube plates to be independently varied without affecting each other.

Ronald P. Hilberg
INVENTOR.

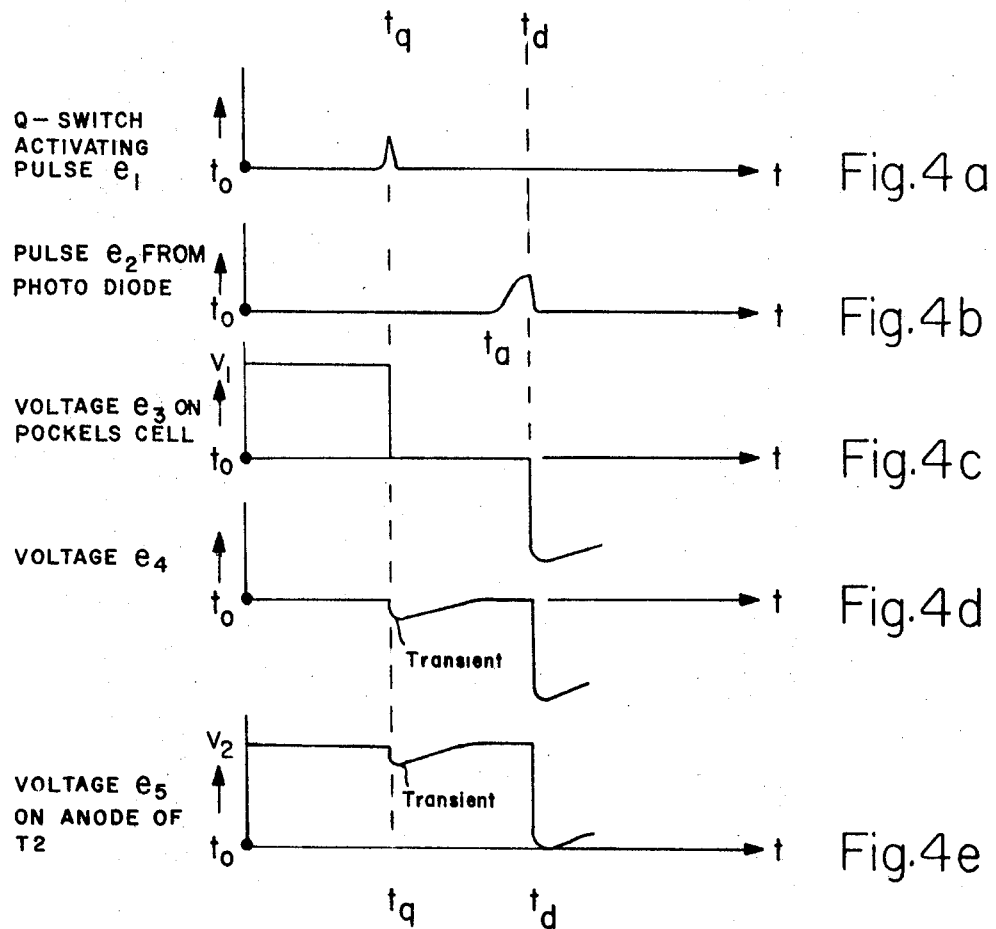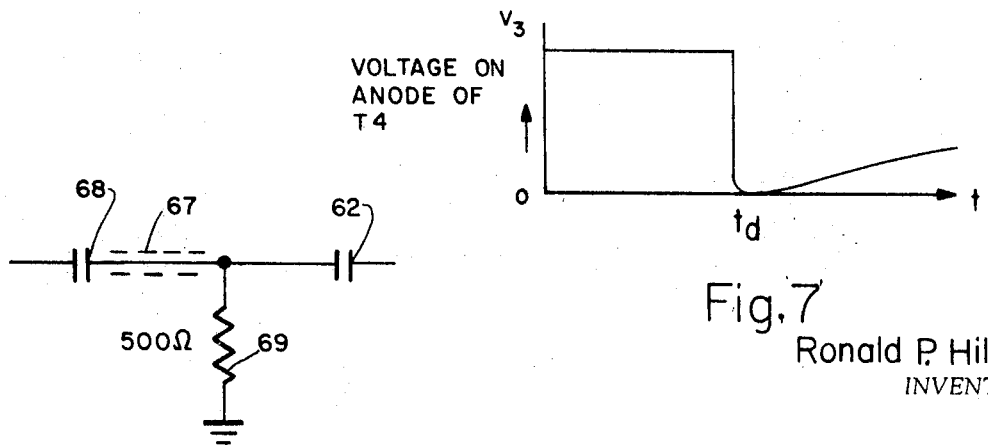

Q-SWITCH ACTIVATING PULSE $e_1$

PULSE $e_2$ FROM PHOTO-DIODE

VOLTAGE $e_3$ ON POCKELS CELL

VOLTAGE $e_5$ ON ELECTRODE 84 OF T3

Ronald P. Hilberg
INVENTOR.

BY

*Alfons Valukonis*
AGENT

LASER WITH COMBINED Q-SWITCH AND SYNCHRONIZED CAVITY DUMP CIRCUIT

BACKGROUND OF THE INVENTION

1. Field of the Invention

This invention relates generally to laser apparatus and more particularly to laser apparatus having actuating circuitry for such apparatus which generates an actuating signal having combined Q-switching and synchronized cavity dumping signal portions to a single modulator such as a Pockels cell employed in the laser.

2. Description of the Prior Art

In U.S. Pat. application Ser. No. 625,549, filed Mar. 23, 1967, and entitled "Lasers Incorporating Time Variable Reflectivity," there is generally provided laser apparatus in which there is time variable reflectivity of the laser cavity during the lasing process. The time variable reflectivity relates to the variation of the reflectivity in the cavity during the power buildup prior to lasing and during lasing by varying the voltage at predetermined times to a polarity rotating means within the cavity and which acts to partially or totally effectively remove the reflectivity of one of the substantially 100 percent mirrors at the ends of the cavity. In the above-mentioned application a Q-switching operation is followed by a cavity-dumping operation. The sequence of events involved is to raise the excited atom population to the desired level while holding the radiation loss in the cavity high enough to prevent lasing, switch the loss in the cavity to a low value, thus allowing the optical energy in the cavity to build up to a maximum value, and to switch out the energy stored in the cavity. Successful operation of such apparatus depends on its ability to open the time variable mirror at the peak of the energy pulse. One embodiment of such apparatus employs a pair of modulators such as Kerr cells and active element actuating circuitry providing separate signals to the Kerr cells for Q-switching and synchronized cavity dumping.

Another U.S. application Ser. No. 686,267, filed Nov. 28, 1967, entitled "Self Synchronized Laser Apparatus and Method," reveals and describes laser apparatus which also employs a pair of modulators with passive element actuating circuitry which generates separate signals for Q-switching and synchronized cavity dumping.

SUMMARY OF THE INVENTION

Laser apparatus wherein means is provided defining a laser cavity, and a source of radiation within the cavity. Polarizer means is situated in the cavity for passing radiation having one polarization direction coming from one direction and diverting radiation having another polarization direction into an absorber. The polarizer means passes radiation having the one polarization direction coming from an opposite direction and diverts radiation having the other polarization direction into an output path. There is also provided in the cavity a single cell for rotating the polarization direction of radiation to establish the other polarization direction when energized and for permitting passage of radiation when deenergized. A circuit means connected to the cell is provided for sequentially energizing, deenergizing, and energizing the cell.

The present invention has advantages in that it provides laser apparatus employing a single modulator such as a Pockels cell and actuating circuitry which generates a single voltage waveform signal to the cell for both Q-switching and cavity dumping. The voltage waveform provides both a Q-switching portion and a synchronized dumping of the cavity energy portion. More specifically, the apparatus provides circuitry which generates a single voltage waveform having the following characteristics:

1. Before Q-switching takes place it has a $\mp 6$ Kv. DC portion suitable for biasing the Pockels cell sufficient to prevent lasing in the cavity.
2. When Q-switching is initiated the $+6$Kv. DC biasing voltage portion on the Pockels cell drops to zero with a fall time of about 10 nanoseconds.
3. Upon initiation of cavity dumping, the bias DC voltage goes to a $-6$ Kv. one-fourth wave retardation voltage portion within 3 nanoseconds, and a delay time of less than 30 nanoseconds.

Another advantage is that the DC retardation bias voltage portion of the waveform can be precisely adjusted such that if the excited atom population excess the desired value due to overpumping, the population will automatically deplete itself back to the desired value by the ordinary lasing process. This is a very important advantage involving a safety feature which guards against creating of the condition whereby the power in the laser cavity due to Q-switching becomes excessive. Another advantage is that small and inexpensive components can be utilized in the practice of the invention.

BRIEF DESCRIPTION OF THE DRAWING

FIGS. 4a—4e show graphs of voltages to be found in various parts of the circuit of FIG. 2;

FIG. 5 shows in schematic form the details of a modification of the circuit of FIG. 2;

FIG. 7 shows a graph of a voltage occurring in the circuit of FIG. 6; and

DESCRIPTION OF THE PREFERRED EMBODIMENT

Figure 1:
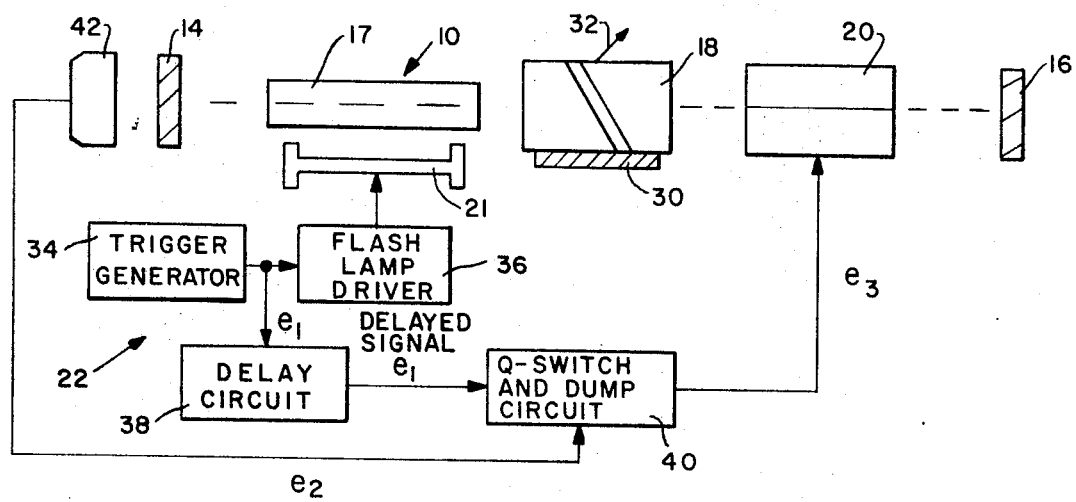
FIG. 1 is a schematic showing, partly in block diagram, of the laser apparatus incorporating the present invention.

Referring now to FIG. 1 there is shown a laser apparatus 10 of the present invention for producing coherent radiation according to time variable reflectivity principles. The laser 10 generally comprises a pair of mirrors 14 and 16 defining a resonant cavity. Positioned within the cavity is a laser rod 17, a polarizer 18, and an electro-optic member 20. A flash lamp 21 is provided for pumping the rod 17. Positioned outside the cavity is an electric circuit generally designated by the numeral 22 for actuating the lamp 21 and the electro-optic member 20.

The rod 17 can be comprised of neodymium. The opposite ends of the rod 17 are directed toward the reflecting surfaces of the mirrors 14 and 16 with the rod having its longitudinal axis perpendicular to the mirrors. For regeneration of the excited atoms in the laser rod 17, the output beam therefrom is confined along its longitudinal axis and is polarized in a direction normal to the axis of the rod 17. The direction of polarization of the laser radiation is determined by the orientation of the polarizer 18. For Glan polarizer 18 shown in FIG. 1, the direction of the polarization of the laser radiation is horizontal, or in the plane of the drawing. Adjacent to the rod is positioned the flash lamp 21 which can be a xenon flash tube, for example.

The mirrors 14 and 16 are positioned parallel to each other and are substantially 100 percent reflective. The polarizer 18 and the electro-optic member 20 are in axial alignment with the laser rod 17. The laser cavity between the mirrors 14 and 16 has a length of approximately 24 inches. All of the flat surfaces within the cavity except the mirrors can be antireflection coated.

The polarizer 18 acts to send radiation in a particular direction, depending on the polarity direction of the radiation. The polarizer 18 may be a Glan polarizer and fashioned from a material such as calcite. The polarizer has a shield 30 on the side which prevents the emission of light from that side.

Radiation which is coming toward the polarizer 18 from the left or in other words from the direction of the laser rod 17, passes undiverted through the polarizer if such radiation is horizontally polarized, but is diverted into the absorber 30 if such radiation is vertically polarized. Radiation which is approaching the polarizer 18 from the right, or in other words from the direction of the mirror 16, also passes undeviated through the polarizer 18 if such radiation is horizontally polarized, but is diverted in the output direction 32 if such radiation is vertically polarized.

The electro-optic member 20 acts as a polarization rotator, when energized, and is effective to rotate the direction of the polarization of the polarized radiation through predetermined angles depending upon the voltage applied. When it is not energized it does not affect the polarity of the laser radiation. The electro-optic member 20 may be a Pockels cell and is in axial alignment with both the rod 17 and the polarizer 18. The Pockels cell 20 may be of the type commercially designated as EOA—415B and which can be activated with a voltage pulse of 6,000 volts at 1.06 microns. Thus, when there is no voltage on the Pockels cell 20 an undeviated transmission of laser radiation takes place through the Pockels cell 20 and the polarizer 18. When the Pockels cell 20 is energized, the path of the polarized laser radiation is controlled by the rotation at the Pockels cell 20 such that it is diverted by polarizer 18 in the output direction 32. The Pockels cell 20 may be energized with either a positive voltage or a negative voltage, and the effect of the Pockels cell 20 on the polarized laser radiation is the same. In other words, the laser radiation can be diverted by polarizer 18 in the output direction 32 by the application of either a positive 6,000 volts or a negative 6,000 volts to the Pockels cell 20.

In accordance with the time variable reflectivity principles of this invention there occurs a high cavity loss interval when the Pockels cell 20 is positively biased, a laser radiation buildup interval when the Pockels cell 20 is unbiased, and an output or cavity dumping interval with the Pockels cell 20 negatively biased.

The circuit 22 consists of a trigger generator 34 which provides an output signal $e$ for actuating a flash lamp driver 36 to pump the lamp 21 to excite the atoms in rod 17. A delay circuit 38 connected to the trigger generator 34 and a Pockels cell Q-switch and cavity dump circuit 40 serves to delay the signal $e_1$ a predetermined time so as to provide the circuit 40 with a delayed signal $e_1$. A photodiode 42 positioned outside the laser serves to monitor the light output leaking through mirror 14 and generates a signal $e_2$ to the circuit 40. The circuit 40 is responsive to the delayed signal $e_1$ and the signal $e_2$ and is connected to the Pockels cell 20 so as to provide a bias signal $e_3$ in its output thereto.

Figure 2:
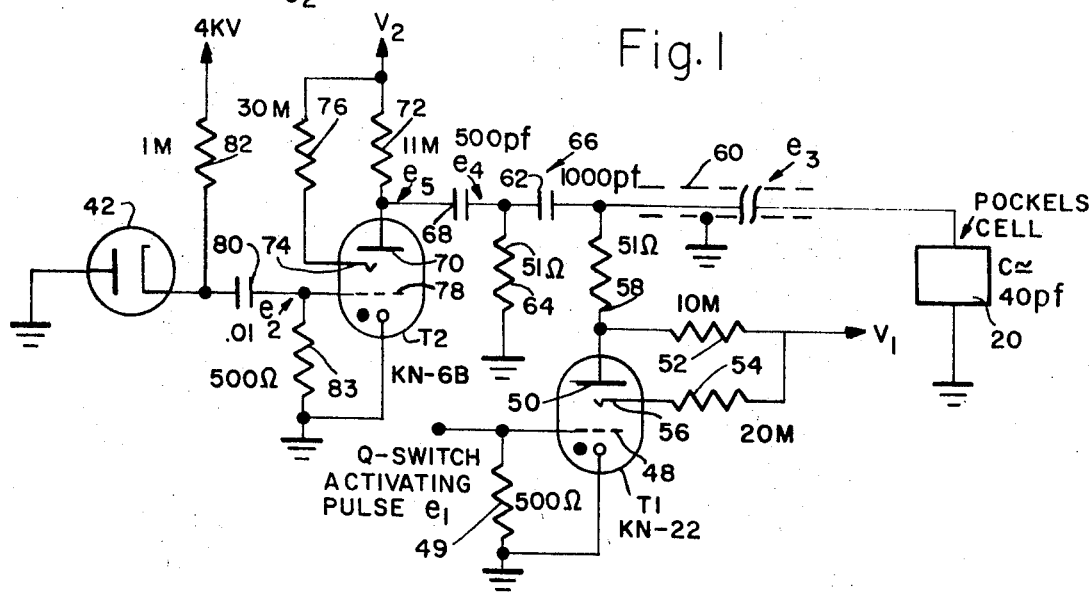
FIG. 2 shows in schematic form the details of the preferred embodiment of the Q-switch and dump circuit of FIG. 1.

Reference is now made to FIG. 2 wherein there is shown the details of the circuit 40 of FIG. 1 which is capable of generating the voltage waveform $e_3$ needed to accomplish the necessary sequence of events, namely a high cavity loss interval, a laser radiation buildup interval and a cavity dumping interval. A trigger gas tube T1 is adapted to have its control grid 48 connected to the delay circuit 38 for actuation thereby with the delayed signal $e_1$. A resistor 49 connects the grid 48 to ground. The anode 50 of tube T1 is connected through a resistor 52 to a source (not shown) of variable DC voltage $V_1$. The tube T1 may be a Krytron cold cathode switch tube type KN—22. The anode 50 of tube T1 is also connected through a resistor 58 and coaxial cable 60 to the Pockels cell 20. A capacitor 62 along with the resistor 64 serves to form a differentiator circuit 66, which is AC coupled by capacitor 68 to the plate 70 of a gas switch tube T2. The tube T2 can be a type KN—6B Krytron tube which is commercially available. The anode 70 is connected through a resistor 72 to a variable DC voltage $V_2$ supply source (not shown). A keep-alive grid 74 of tube T2 is likewise connected through a resistor 76 to the source of variable DC voltage $V_2$. The control grid 78 of tube T2 is connected through a capacitor 80 to the photodiode 42. A resistor 82, connected at one end to the side of the capacitor 80 which is connected to photodiode 42, is connected at the other end to a source (not shown) providing a 4 Kv. DC voltage. A resistor 83 connected at one end to the control grid 79 is connected at the other end to ground.

Operation of the laser apparatus of this invention can best be described with reference to FIGS. 1, 2, 3, and 4. Initially the voltages $V_1$ and $V_2$ are each independently adjusted to 6 Kv., for example, and are applied to the plates of tubes T1 and T2, respectively. The application of a voltage $V_1$ on the plate of tube T1 provides a positive DC voltage on the Pockels cell which causes rotation of the polarization of radiation emanating from the rod 17 such that a high energy loss condition is established within the laser cavity. In this condition laser radiation emanating from the rod 17 is diverted by polarizer 18 either into the absorber 30 or in the output direction 32, depending on the polarization of the radiation. Next, at time $t_o$ the trigger generator 34 is actuated to provide the signal $e_1$ which causes the flash lamp driver 36 to energize the lamp 21 to start nonregenerative pumping or irradiating of the atoms in the rod 17. The number of excited atoms in the rod 17 reaches a maximum within a few hundred microseconds. The signal $e_1$ is delayed by the delay circuit 38 for a time $(t_q-t_o)$ which is equal to the time it takes for the number of excited atoms to reach a maximum, and at time $t_q$, as shown in FIG. 4a, the delayed signal $e_1$ is applied to the grid 48 of tube T1 causing tube T1 to conduct heavily, and therefore causing the anode 50 thereof to short to ground and the voltage $e_3$ on the Pockels cell 20 also to go quickly from $V_1$ to zero. With voltage $V_1$ thus removed from the plate 50 of tube T1 and the Pockels cell 20, an undeviated transmission of radiation takes place through the polarizer 18 and the Pockels cell to the mirrors 14 and 16 such that lasing begins to take place within the cavity, and the radiation energy starts to buildup within a frequency range including the characteristic frequency of the lasing atoms in the rod 21.

The change from $V_1$ to zero in voltage $e_3$ which occurs at time $t_q$ is differentiated by the differentiator network 66, and thus appears as a short negative going transient in the voltage $e_4$ as shown in FIG. 4d. A similar negative transient appears in the voltage $e_5$ on the anode of tube T2 as shown in FIG. 4e. The purpose of the differentiating circuit 66 is to prevent the entire step change in the voltage $e_3$ from being AC coupled to the anode of T2, to thus subtract from the voltage level $V_2$ which normally appears on the anode of T2. The use of the differentiating circuit 66 thus prevents interaction between the changes in the hold-off voltage $V_1$ and the dumping voltage $V_2$.

Figure 3:
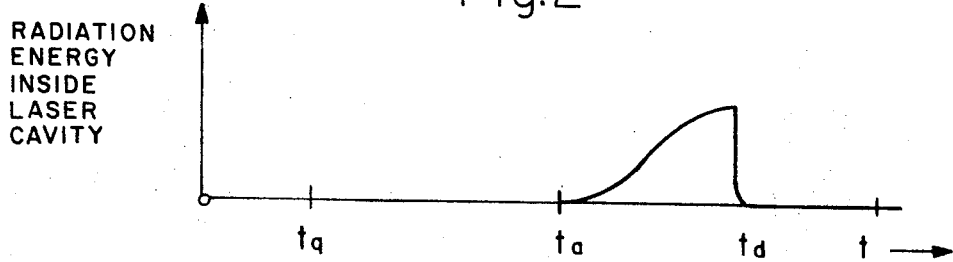
FIG. 3 shows a graph relating radiation energy occurring inside the laser cavity of FIG. 1 and time which is helpful to the understanding of the present invention.

An interval of about 150 nanosecond occurs before the radiation energy reaches a significant level as indicated at $t_a$ in FIG. 3 after which the level rapidly rises to its peak intensity designated at $t_d$. That is, after time $t_a$, photons are emitted from the laser rod 21 and make many traversals within the cavity through the rod 17 and between the mirrors 14, 16, passing through the Pockels cell 20 and the polarizer 18 without deviation. As the radiation energy builds up between $t_a$ and $t_d$ in FIG. 3, the population of excited atoms rapidly decreases. The time between $t_q$ and $t_d$ is approximately 200 nanoseconds. The power leaking through the mirror 14 builds up at the same rate as the energy within the cavity, and thus the voltage pulse that appears at the output of photodiode 42 has the same shape as that of the energy pulse of FIG. 3. This voltage pulse is shown in FIG. 4b and is designated $e_2$.

The pulse $e_2$ is applied to the trigger grid 78 of tube T2 whereby the tube T2 becomes shorted to ground and the voltage on its plate 70 drops to zero as shown in FIG. 4e, and the voltages $e_3$ and $e_4$ develop negative going portions as shown in the FIG. 4c and 4d, respectively. There is an interval delay in the tube T2, such that a short interval of time elapses between the application of a triggering voltage to its grid 78 and the time at which the tube T2 becomes conducting. This interval delay can be changed by changing the keep-alive current applied to the grid 74. In the operation of this embodiment of the invention the amount of keep-alive current and the amplitude of the signal $e_2$ applied to the grid 78 of tube T2 are adjusted such that tube T2 becomes conducting at the time $t_d$ when the laser radiation energy within the cavity is at a maximum. With the application of the negative-going portion of the $e_c$ voltage to the Pockels cell 20 at time $t_d$ as shown in FIG. 4c, rotation of the polarization of the radiation in the cavity is achieved and the energy is caused to follow the path 32 out of the polarizer 18. It will be appreciated that it is only necessary that the voltage be maintained at the negative value for a few nanoseconds, since its only function is to cause draining of the laser cavity of radiation.

The circuit of FIG. 2 can be modified to decrease the fall time of the negative bias voltage portion of the voltage $e_3$ used to dump the cavity at time $t_d$. In this modification a type KN—22 tube is substituted for the KN—6B tube utilized in the embodiment of FIG. 2. The KN—22 has a faster turn-on time than the KN—6B, but has a lower voltage capability. Thus, in order to achieve the desired magnitude of the negative bias voltage portion of the voltage $e_3$, the circuit of FIG. 2 is also provided with a voltage doubler in the form of a length of coaxial cable 67 such as RG—58, 50 ohm cable which is inserted between the capacitor 68 and the junction of capacitor 62 and a resistor 69 having an ohmic value of 500, substituted for the resistor 64, as shown in FIG. 5. The length of cable 67 should be such as to provide voltage doubling. The operation of this modified circuit is the same as that of the circuit of FIG. 2 except that a lower voltage $V_2$ can be applied to the anode of $T_2$.

Figure 6:
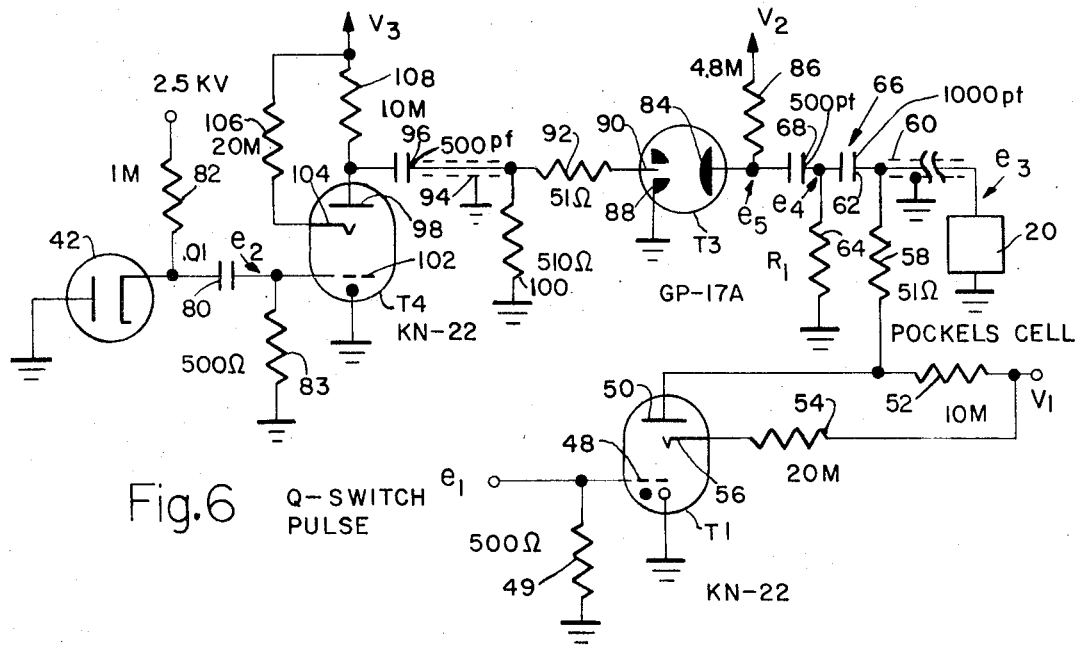
FIG. 6 shows in schematic form the details of another embodiment of the Q-switch and dump circuit of FIG. 1.
Figure 8A:
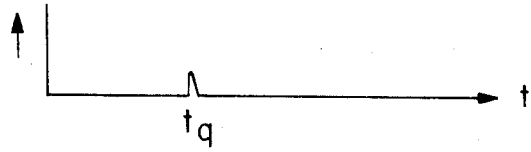
FIGS. 8a—8d show graphs of voltages to be found in various parts of a modification of the apparatus of FIG. 6 of the present invention.
Figure 8B:
Figure 8C:
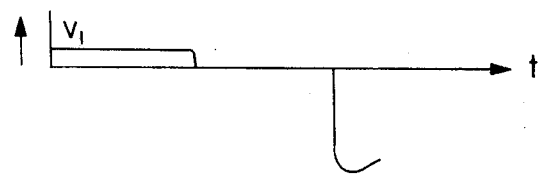
Figure 8D:
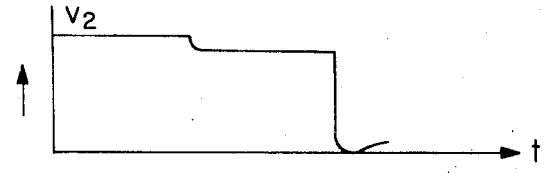

Reference is now made to FIG. 6 wherein there is shown the details of still another embodiment of the Q-switch and dump circuit of FIG. 1. The circuit of FIG. 6 is somewhat similar to the circuit of FIG. 2 and like numerals designate like parts. In FIG. 6 a triggered spark gap tube T3 and a gas switch tube T4 with associated components are substituted for the tube T2 of FIG. 2. The tube T3 can be a commercially available GP-—17A and the tube T4 can be a KN—22. The opposite electrode 84 of the tube T3 is adapted to be connected through a resistor 86 to the source (not shown) of variable DC voltage $V_2$. The adjacent electrode 88 of the tube T3, is connected to ground and the trigger probe 90 is connected through a resistor 92, coaxial cable 94, capacitor 96 to the plate 98 of tube T4. A resistor 100 connects the connecting point between the resistor 92 and cable 94 to ground. The control grid 102 of tube T4 is connected as shown and the keep-alive grid 104 is connected through a resistor 106 to a source (not shown) of DC voltage $V_3$. A resistor 108 connects the anode 98 to the same source (not shown) supplying the DC voltage $V_3$. The resistor 82 is connected to a source (not shown) supplying a 2.5 Kv DC voltage. The cable 94 serves as a voltage doubler and is long enough to achieve the desired voltage doubling.

Operation of the circuit of FIG. 6 is similar to the operation of the circuit of FIG. 2 up through the time $t_q$ and can best be described having reference to FIGS. 3, 4, 6 and 7. The voltage $V_1$, $V_2$, and $V_3$ are initially applied to the tubes T1, T3, and T4, respectively. As before, the application of voltage $V_1$ on the plate of tube T1 provides a positive DC voltage bias on the Pockels cell 20 which causes radiation emanating from the rod 17 to be diverted either into the absorber 30 or in the output direction 32, depending on the polarization of the radiation to establish a high energy loss condition within the laser cavity. At the time $t_o$ the trigger generator is actuated to provide the signal $e_1$ to the lamp driver 36 which energizes the lamp 21 to start the pumping of atoms in the rod. The signal $e_1$ is delayed for the time $(t_q-t_o)$ and is then applied to the grid 48 of tube T1 causing it to conduct and the voltage $e_3$ on the Pockels cell 20 to go from a voltage $V_1$ to zero. With the voltage $V_1$ removed from tube T1 and the Pockels cell 20 lasing begins within the cavity as before. The change in voltage $e_3$ occurring at time $t_q$ appears as the negative going transient in the voltage $e_4$, and as a similar transient in the voltage $e_5$ appearing on the electrode 84 of tube T3. The circuit of FIG. 6 can be triggered at a somewhat lower voltage level from the phototube 42 and has a shorter trigger delay than that inherent in the tube T2 of FIG. 2. As the energy in the laser cavity builds up, some of this energy leaks through the mirror 14 and, as in the embodiment of FIG. 2, energizes the photodiode 42 to produce the cavity dump signal $e_2$. The pulse $e_2$ is applied to the grid 102 of the tube T4 whereby the tube T4 becomes shorted to ground and the voltage $V_3$ on the anode of T4, as shown in FIG. 7, drops to zero producing a negative going pulse which is doubled in magnitude by the voltage doubler cable 94. This negative going pulse is AC coupled to the trigger probe 90 of tube T3 which becomes shorted to ground and the voltage on its opposite electrode 84 drops to zero as shown in FIG. 4e. This negative going voltage is AC coupled back to the Pockels cell 20, and the voltage thereon goes from zero to a negative value, as shown in FIG. 4c.

The circuit of FIG. 6 can be modified to eliminate the differentiator circuit 66 therefrom. Operation of such a modified circuit is similar to the operation of the circuit of FIG. 6 and provides the corresponding voltage waveforms shown in FIGS. 8a—8d. With this circuit a shorter time interval between Q-switching time $t_q$ and cavity dumping time $t_d$ can be obtained, since it is not necessary to wait for the differentiated pulse $e_4$ of the circuit of FIG. 6 to recover. However, a change in either one of the applied voltages $V_1$ or $V_2$ affects both the Q-switching and dumping voltage portion levels applied to the Pockels cell.

It will be obvious to those skilled in the art that many other changes and modifications of the invention may be made without departing from the true scope thereof as defined in the appended claims.

I claim:
1. Laser apparatus comprising:
   means defining a laser cavity;
   laser means in said cavity for emitting radiation;
   light polarizer means in said cavity;
   cell means in said cavity for changing the polarity of light;
   a first trigger gas switch tube having an anode connected to said cell means and to a first source of variable DC voltage capable of supplying a first predetermined voltage at said anode and cell means for changing the polarization of light within said cavity to establish reduced reflectivity within said cavity, said first tube being responsive to a trigger signal eliminating said first voltage at said anode and cell means to deenergize said cell means to establish light amplification within said cavity;
   a second trigger gas switch tube having an anode connected to a second source of variable DC voltage capable of supplying a second predetermined voltage at said anode, said second tube being responsive to a trigger signal generated by energy leading from said cavity at its peak amplified value eliminating said second voltage at said second tube anode; and
   capacitor means interconnecting said anodes for providing a voltage to said cell means in response to changes in said second predetermined voltage to change the polarization of light within said cavity and to discharge the light energy at its peak amplified value from said cavity.

2. The laser apparatus of claim 1 further comprising: differentiator circuit means in series connection with said capacitor means.

3. The apparatus of claim 2 further comprising: voltage doubling means in series connection with said capacitor and differentiator means.